United States Patent [19]

Drori

[11] 4,278,540
[45] Jul. 14, 1981

[54] BACK WASHING FLUID FILTERS

[76] Inventor: Mordeki Drori, 89 Zahal St., Kiron, Israel

[21] Appl. No.: 148,494

[22] Filed: May 9, 1980

[30] Foreign Application Priority Data

May 17, 1979 [IL] Israel .......................................... 57320

[51] Int. Cl.³ ............................................. B01N 29/38
[52] U.S. Cl. ..................................... 210/107; 210/108
[58] Field of Search ................................. 210/107, 108

[56] References Cited
U.S. PATENT DOCUMENTS

| 4,042,504 | 8/1977 | Drori | 210/107 |
| 4,045,745 | 8/1977 | Drori | 210/107 |

*Primary Examiner*—John Adee
*Attorney, Agent, or Firm*—Benjamin J. Barish

[57] ABSTRACT

A backwashable filtering device is described of the type including a housing, a filter body, a backwash nozzle having a nozzle inlet disposed adjacent to the upstream surface of the filter body, and pressure sensor means for sensing the pressure drop across the filter body and effective, upon sensing a predetermined pressure drop, to initiate a backwashing operation by connecting the backwash nozzle to the atmosphere and initiating relative rotary movement between the filter body and the backwash nozzle. The filtering device further includes a position sensor for sensing the home angular position of the filter body with respect to the backwash nozzle, and a control effective, only when said home angular position is sensed, for terminating the backwash operation.

9 Claims, 4 Drawing Figures

U.S. Patent  Jul. 14, 1981  4,278,540
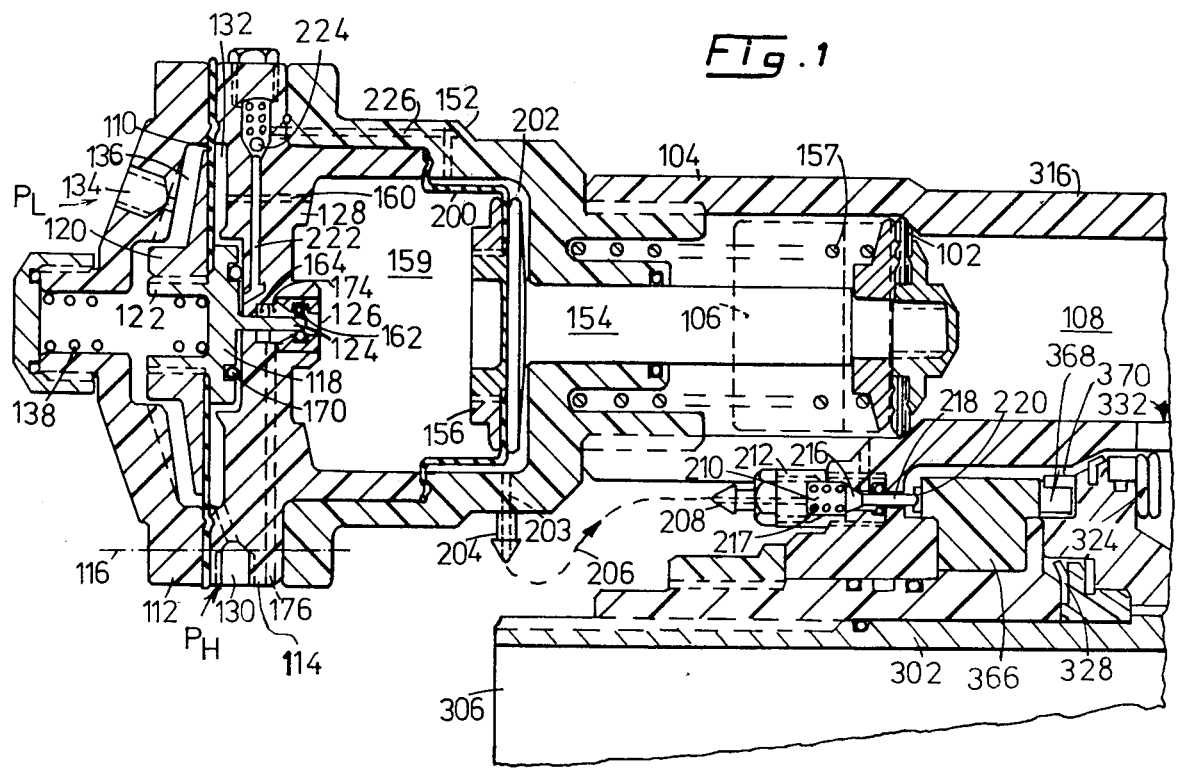
Fig. 1
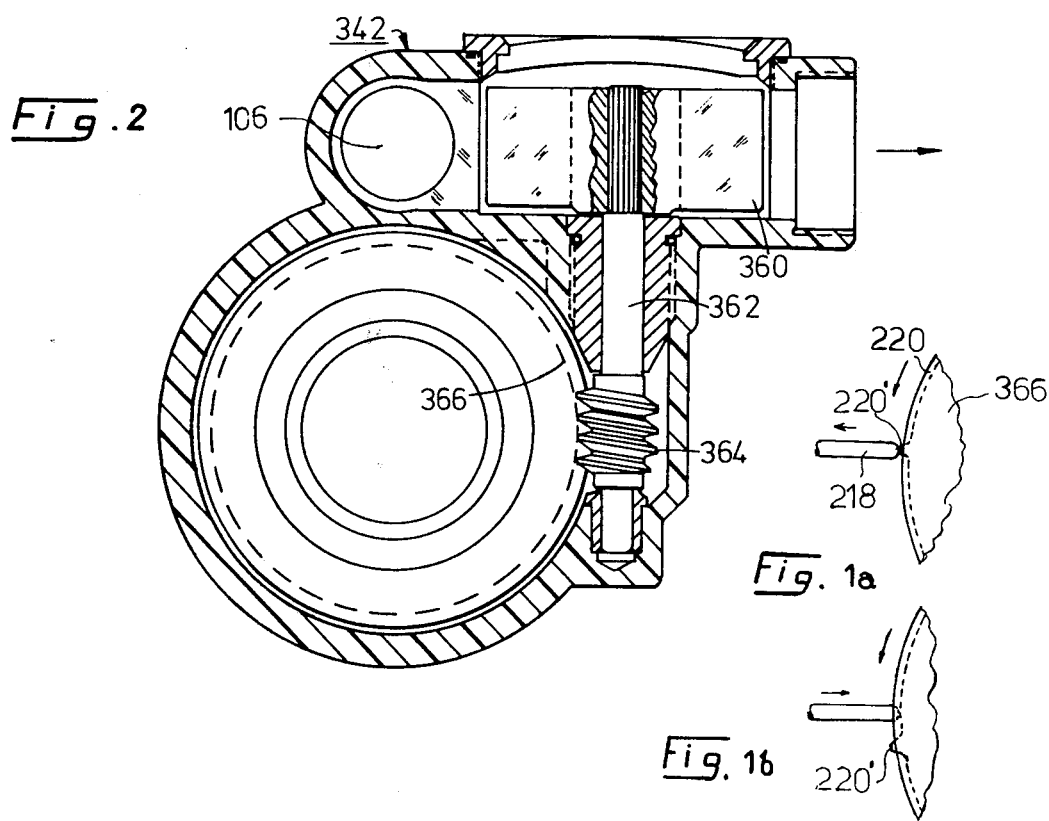
Fig. 2
Fig. 1a
Fig. 1b

BACK WASHING FLUID FILTERS

BACKGROUND OF THE INVENTION

The present invention relates to backwashing fluid filters including differential-pressure sensors which sense when the filter body is overly clogged to initiate a backwashing operation for backwashing the fluid feed through the filter body while relative motion is effected between the filter body and a backwash nozzle provided in the filter. The present invention is particularly directed to the differential-pressure sensor included in such a backwashing filter for sensing the condition of the filter body and for controlling the initiation and termination of the backwashing operation. The invention is especially, but not exclusively, applicable to the differential-pressure sensor described in my patent application No. 114,894, and is therefore described below with respect to this application.

My above-cited patent application relates to a differential-pressure valve, and also to a system including a controlled device, such as a main valve, controlled by the differential-pressure valve. One use for such a valve and system, as mentioned in the above-cited patent application, is in backwashable filtering devices which are automatically actuated to backwash the filter whenever a predetermined quantity of dirt has accumulated on the filter as sensed by the differential-pressure valve sensing the difference in the pressure at points upstream and downstream of the filter body. When a backwashing operation is initiated, the backwash nozzle within the filtering device is connected to the atmosphere to produce a backwashing flow of the fluid through the filter body and out through the backwash nozzle. In addition, relative rotary movement is effected between the filter body and the backwash nozzle to cause the backwash nozzle to scan and clean the complete outer surface of the filter body.

BRIEF SUMMARY OF THE INVENTION

The present invention is directed to improvements related particularly to the differential-pressure sensor when it is included in a backwashable filtering device.

According to one aspect of the present invention, there is provided a backwashable filtering device including a housing having an inlet connectable to an upstream fluid pipe and an outlet connectable to a downstream fluid pipe, a filter body having an upstream surface facing the housing inlet, a backwash nozzle within the housing and having a nozzle inlet disposed adjacent to the upstream surface of the filter body, and pressure sensor means for sensing the pressure drop across the filter body and effective, upon sensing a predetermined pressure drop, to initiate a backwashing operation by connecting the backwash nozzle to the atmosphere and initiating relative rotary movement between the filter body and the backwash nozzle; characterized in that the filtering device further includes position sensor means for sensing the home angular position of the filter body with respect to the backwash nozzle, and control means effective, only when said home angular position is sensed, for terminating the backwash operation.

Such an arrangement more positively assures that the complete upstream surface of the filter body will be uniformly cleaned and thereby prevents the possibility that dirt may build-up on a portion of the filter body which dirt build-up could eventually become wedged between the backwash nozzle and the filter body to damage the latter or to interfere with the relative rotation between the two.

In the preferred embodiment of the invention described below, the angular position sensor means sensing the angular position of the filter body with respect to the backwash nozzle comprises a spring-biassed pin carried by one engageable by the other.

More particularly, in the described embodiment the filter body is rotatably mounted with respect to the backwash nozzle, the backwash nozzle carrying said position sensor pin spring-biassed against an annular surface of the filter body as the latter is rotated during the backwash operation, said annular surface including an interruption at the home position of the filter body.

According to a further feature in the preferred embodiment described below, the control means comprises a pilot valve which, in the home position, vents a chamber of the pressure sensor means to the atmosphere permitting the pressure sensor means to terminate the backwash operation. The latter chamber is on one side of a displaceable member coupled to a main valve which is opened when the chamber is pressurized, there being a second chamber on the other side of the displaceable member connected to a high pressure source tending to move the main valve to its closed position. The control means further includes a fluid passageway for connecting the first-mentioned chamber to the high-pressure source when the pressure sensor means senses the predetermined pressure drop to move the main valve to its open position and thereby to initiate a backwashing operation.

BRIEF DESCRIPTION OF THE DRAWINGS

The invention is herein described, by way of example only, with reference to the accompanying drawings, wherein:

FIG. 1 is a longitudinal sectional view illustrating one form of differential-pressure sensor constructed in accordance with the invention and used in a backwashable filtering device, only a fragment of which is illustrated.

FIGS. 1a and 1b illustrate this home position and non-home position, respectively, of the litter body; and FIG. 2 is a transverse sectional view along lines II—II of FIG. 1, to more clearly illustrate the rotary drive for the backwashable filtering device of FIG. 1.

DESCRIPTION OF A PREFERRED EMBODIMENT

As indicated earlier, the differential-pressure sensor illustrated in FIG. 1 is of the type described in my prior patent application No. 114,894, but it includes improvements or modifications particularly to adapt it for controlling a backwashing operation in a filtering device. To facilitate understanding the construction and operation of the differential-pressure sensor illustrated in FIG. 1, the same reference numerals, but increased by "100", are used with respect to those elements which are generally common with those in my patent application No. 114,894, the new elements being identified by reference numerals beginning with "200".

Briefly, the differential-pressure sensor illustrated in FIG. 1 is used to initiate a backwashable filtering device, whereupon piston 102 is moved within a cylinder 104 to uncover an opening 106 which connects chamber 108 of the backwash nozzle to the atmosphere, thereby backflushing the filter through the nozzle and through opening 106.

More particularly, the differential-pressure sensor includes a diaphragm 110 mounted between a pair of housing sections 112, 114 secured together by bolts 116. The sensor further includes a circular rigid disc 118 secured within a central opening formed through the diaphragm 110 by means of a plastic cap 120 threaded onto exterior threads formed on stem 122 of the circular disc. The circular disc 118 carries a rod-shaped valve member 124 movable in or out of a valve opening 126 formed in an end wall 128 integral with housing section 114.

A high-pressure source $P_H$, taken from a point upstream of the filter body to be described below, is inletted via port 130 into a high-pressure chamber 132 at one side of diaphragm 110; and a low-pressure source $P_L$, taken from a point downstream of the filter body, is inletted via port 134 into a low pressure chamber 136 at the opposite side of the sensor diaphragm 110. A coil spring 138 biases the diaphragm to the closed position of its valve member 124 with respect to valve passageway 126.

The main valve piston 102 is connected by a stem 154 to a plunger 156 movable within housing section 152. A spring 157 interposed between piston 102 and an annular recess in housing section 152, urges piston 102, and thereby plunger 156, in the direction (rightwardly in FIG. 1) tending to decrease the volume of chamber 108.

End wall 128, through which is formed the valve passageway 126, is common to the chambers 132 and 159, the latter chamber being defined by the end wall 128 and the plunger 156 movable within cylinder 152. Chamber 159 is connected to the high-pressure chamber 132 by a small bore 160 through end wall 128, this bore (e.g. 1 mm) being considerably smaller in cross-sectional area than that of the valve passageway 126 (e.g., 3 mm).

Valve passageway 126 is formed in a dished central part of end wall 128 and is lined with an O-ring 162 adapted to sealingly engage the rod-shaped valve member 124 when the latter is in its closed position. The movement of valve member 124 is guided by a guide ring 164 carried on the opposite face of end wall 128 and formed with an opening for guiding the movement of the valve member 124, but permitting some clearance with respect thereto; that is, the rod-shaped valve member 124 is not sealingly received within guide ring 164.

An O-ring 170 is received within a circular recess formed on the inner face (i.e. the face exposed to the high pressure chamber 132) of the circular disc 118. O-ring 170 is of larger diameter than, and circumscribes, both the guide ring 164 carried by the end wall 128, and the valve passageway 126 formed through the dished portion of the end wall.

As described in the above-cited patent application, the arrangement, insofar as described above, is such that when the sensor diaphragm 110 is in the valve-closed position (i.e. with its valve member 124 received within valve passageway 126 as shown in FIG. 1), the O-ring 170 forms an annular sealing surface between diaphragm 110 and end wall 128. This seals off that portion 172 of the high pressure face of the diaphragm 110 enclosed by the O-ring 170, from the high-pressure within chamber 132, thereby increasing the differential pressure ($P_H - P_L$) required to actuate the sensor diaphragm 110 to move its valve member 124 out of the valve passageway 126 to open the valve. On the other hand, when the sensor diaphragm 110 is in the valve-closed position, this portion 172 of the high-pressure face of the diaphragm is exposed to the high-pressure in chamber 132, thereby decreasing the differential pressure required to move the diaphragm to its closed position. Such an arrangement imparts a quick-action operation in opening and closing the valve, and moreover, requires a higher differential pressure to open the valve than to close it, both of which characteristics are very advantageous when the sensor is used in controlling a backwashing operation in a filtering device, as more particularly described in my patent application No. 114,894.

One of the improvements in the sensor of the present application is the provision of a diaphragm 200 between plunger 156 and housing section 152, so as to divide the interior of the latter housing section into the previously-mentioned chamber 159 at one side of diaphragm 200, and another chamber 202 at the opposite side of diaphragm 200. The latter chamber 202 is connected, via bore 203, port 204, tube 206, and another port 208, to a chamber 210 within a cylinder 212 fixed to housing section 104. Cylinder 212 includes a valve opening normally closed by valve member 216 under the influence of a spring 217 within cylinder 212, but may be moved (leftwardly, FIG. 1) to open the valve 214 in order to vent chamber 210 to the atmosphere.

Moving the valve member 216 to the open position is effected by a pin 218 biassed by spring 217 to move within an annular cam surface 220 rotating with the filter body. Cam surface 220 is in the form of a recess or low surface for most of its length but includes a projection or high surface 220' (FIG. 1a) in the home position of the filter body which is engaged by pin 218, to open the valve 216. As will be described more particularly below, when the rotatable filter body is in this home position opening valve 216, pin 218 engages the high point 220' of cam surface 220 and therefore the interior of chamber 202 is vented to the atmosphere via bore 203, ports 204, 208, chamber 210, and valve 214. At all other positions of the rotatable filter body, pin 218 engages a low-portion of surface 220 and therefore valve 216 is closed.

In addition, the space 174 between the guide ring 164 and the valve passageway 126, is connected via bore 222 through end wall 128, a one-way valve 224, and another bore 226 through housing section 152, to chamber 202. Thus, as soon as the O-ring 170 moves away from end wall 128 by the actuation of the sensor diaphragm 110, the inlet pressure ($P_H$) from inlet 130 is applied via space 174 and bores 222, 226 to chamber 202. This aids moving the piston 102 to its open position to uncover passageway 106, and thereby more positively assures the opening of this passageway, and thereby the initiation of a backwashing operation, even under low inlet pressures when the inlet pressure might not be sufficient to overcome the force of spring 157.

Bores 222 and 226 (e.g., both about 1.4 mm) are of larger cross-sectional area than bore 203 (e.g. 1.0 mm) but are of slightly smaller cross-sectional area than bore 176 (e.g. 1.5 mm). The significance of the foregoing will be described below in connection with the complete operation of the device. In addition, one-way valve 224 permits the flow of fluid from space 174 into chamber 202, but not vice versa, also for a reason to be described more particularly below.

The backwash filtering device may be of any known construction, e.g. as described in my application No.

92,583; therefore only that portion cooperating with the differential-pressure sensor controlling the backwashing operation is illustrated in FIG. 1. Thus, the illustrated portion of the backwashable filtering device comprises an inner rigid tube 302 defining the filter outlet 306 at one end, an outer housing 316, a rotatable filter body 324 rotatably mounted between the inner metal tube 302 and the outer housing 316, and a backwash nozzle 332 having an inlet opening disposed adjacent to the outer cylindrical surface of the filter body 324. The filter body 324 is rotated on a pair of end bearings 328 with respect to the fixed backwash nozzle 332 by means of a hydraulic drive unit 342 actuated by the kinetic energy of the fluid flowing through the backwash nozzle 332. Thus, as shown particularly in FIG. 2, when piston 102 is actuated by the previously-described pressure sensor including diaphragm 110 so as to uncover opening 106, the fluid is backflushed through nozzle 332 and opening 106 to the hydraulic drive unit 342. The exiting dirty fluid impinges blades 360 at one end of a rotor shaft 362 whose opposite end is formed as a worm 364 meshing with a gear 366. The latter gear is formed with teeth 368 along its circumference facing the filter body 324, which body is formed with interfitting teeth 370 whereby the rotation of gear 366 also rotates the filter body 324.

The operation of the backwashable filtering device illustrated in the drawings will now be described.

First, port 130 is connected to a high-pressure (P$_H$) point upstream of the filter body 324, and port 134 is connected to a low-pressure (P$_L$) point downstream of the filter body. Assuming that the filter body 324 is relatively clean, there will be very little difference between the two pressure points, and therefore between the pressures in chambers 132 and 136, so that spring 138 will maintain diaphragm 110 in its illustrated position wherein its valve member 124 closes valve opening 126. At the same time, chamber 159 will be pressurized via bore 160 leading from the high-pressure chamber 132 to chamber 159, assuring that the plunger 156, and thereby the piston 102, will be in their illustrated positions to the right of opening 106. The pressure within the backwash nozzle 332 will therefore remain high so that the backwash nozzle is not made operative. In this normal operating condition of the filtering device, the rotary filter body 324 would be in its home position wherein pin 218 of valve member 216 is engaged by the projecting point 220' in cam surface 220 of the rotary filter body, thereby venting chambers 212 and 202 to the atmosphere, assuring that the pressure within chamber 159 will retain valve 102 in its illustrated closed position with respect to opening 106.

Now, as dirt accumulates on the upstream surface (outer) of the filter body 324, the pressure within chamber 136 begins to drop with respect to that within chamber 132, until a point is reached wherein the pressure difference is sufficient to cause diaphragm 110 to begin to move against the force of spring 138. As soon as this occurs, O-ring 170 moves with the diaphragm away from the face of the end wall 128, which exposes an enlarged surfaced area (i.e. enlarged by the area within the O-ring) of the face of the sensor diaphragm subjected to the high pressure of chamber 132. This enlarges the force acting on the diaphragm to move it to the opening position, and thereby produces a positive fast-acting opening of the valve member 124 with respect to the valve passageway 126.

As soon as this occurs, chamber 202 becomes pressurized via bores 222 and 226, thereby applying an increased force moving plunger 156, and thereby valve 102, leftwardly until the latter uncovers passageway 106 to initiate a backwashing operation. Although at this instant (i.e. before the filter body 324 has begun to rotate during the backwashing operation) chamber 202 is still vented to the atmosphere via bore 213 and valve member 216. Nevertheless because bore 203 is of smaller cross-sectional area than bores 222 and 226 as described above, chamber 202 becomes pressurized sufficient to initiate the backwashing operation, and as soon as it is initiated, the rotary filter body 324 moves away from its home position so as to close valve 214 and thereby to maintain the pressure within chamber 202. At the same time, as soon as valve member 124 opens the valve passageway 126, bore 176 vents chamber 159 to the atmosphere.

It will thus be seen that when a predetermined pressure drop has been sensed across the filter body 324, thereby indicating an undue accumulation of dirt on its upstream surface, valve member 102 will uncover passageway 106 to vent the interior of the backwash nozzle 332 to the atmosphere. This initiates the backwash operation wherein the backwashing fluid is discharged to the atmosphere via the hydraulic drive unit 342. The kinetic energy in the discharged fluid rotates blades 360 and thereby rotates the filter body 324. As soon as the filter body moves from its home position, valve 216 is closed by the low cam surface 220 engaged by position sensor pin 218, thereby terminating the venting of chamber 202 to the atmosphere, and permitting the chamber to remain pressurized.

The backwash operation will thus continue until the filter body is sufficiently clean so as to lower the pressure differential applied to the opposite faces of diaphragm 110 such that spring 138 returns the diaphragm to the illustrated position wherein its valve member 124 moves into valve passageway 126. When this occurs, the pressure within chamber 159 then builds up by the high-pressure applied thereto from chamber 132 via bore 160. However, chamber 202 at the opposite side of diaphragm 200 remains pressurized, first because the one-way valve 224 does not permit the reverse flow of fluid from the chamber 202, and secondly because valve member 216 closes the valve passageway 214 at all non-home positions of the rotary filter 324 thereby interrupting the venting of chamber 202 to the atmosphere. Accordingly, the backwash operation and the rotation of the filter body continue. However, as soon as the filter body 324 has rotated to its home position, the high surface 220' on its cam face 220 moves the position sensor pin 218 leftwardly, moving valve member 216 to open valve passageway 214, thereby venting the interior of chamber 202 to the atmosphere.

Thus, when the filter body 324 has been cleaned during the backwashing operation, diaphragm 110 returns to close passageway 126 thereby causing chamber 159 to be pressurized via bore 160 leading to the high-pressure chamber 130; and when the rotary filter body 324 has returned to its home position, chamber 202 on the other side of diaphragm 200 becomes vented to the atmosphere via valve passageway 214 as described above. Accordingly, plunger 156 moved by the high pressure in chamber 159 rightwardly to cause valve member 102 to close passageway 106, thereby terminating the backwash operation.

If desired, the "homing feature" provided by the position sensor pin 218 may be disabled by merely removing the ball in the one-way valve 224. Thus, if that ball is removed, the bores 222 and 226 permit the flow of the fluid in both directions, i.e., not only in the direction from the high-pressure chamber 132 to chamber 202 as described previously when a backwash operation is initiated, but also in the reverse direction from chamber 202 via bores 226 and 222, to space 174 and bore 176 to the atmosphere, when the filter body has been sufficiently cleaned during the backwash operation so as to restore the pressure sensor 110 to its home position as illustrated in FIG. 1 of the drawings.

While the invention has been described with respect to one preferred embodiment, it will be appreciated that many variations, modifications and other applications of the invention may be made.

What is claimed is:

1. A backwashable filtering device including a housing having an inlet connectable to an upstream fluid pipe and an outlet connectable to a downstream fluid pipe, a filter body having an upstream surface facing the housing inlet, a backwash nozzle within the housing and having a nozzle inlet disposed adjacent to the upstream surface of the filter body, and pressure sensor means for sensing the pressure drop across the filter body and effective, upon sensing a predetermined pressure drop, to initiate a backwashing operation by connecting the backwash nozzle to the atmosphere and initiating relative rotary movement between the filter body and the backwash nozzle; characterized in that the filtering device further includes position sensor means for sensing the home angular position of the filter body with respect to the backwash nozzle, and control means effective, only when said home angular position is sensed, for terminating the backwash operation.

2. A device according to claim 1, wherein said angular position sensor means sensing the angular position of the filter body with respect to the backwash nozzle comprises a spring-biased pin carried by one engageable by the other.

3. A device according to claim 1, wherein the filter body is rotatably mounted with respect to the backwash nozzle, the backwash nozzle carrying said position sensor pin spring-biassed against an annular surface of the filter body as the latter is rotated during the backwash operation, said annular surface including an interruption at the home position of the filter body 4. A device according to claim 1, wherein the filter body. said control means comprises a pilot valve which, in the home position, vents a chamber of the pressure sensor means to the atmosphere permitting the pressure sensor means to terminate the backwash operation.

5. A device according to claim 4, wherein said chamber is on one side of a displaceable member coupled to a main valve which is opened when said chamber is pressurized, there being a second chamber on the other side of said displaceable member connected to a high pressure source tending to move said main valve to its closed position, said control means further including a fluid passageway for connecting said first-mentioned chamber to said high-pressure source when the pressure sensor means senses said predetermined pressure drop to move said main valve to its open position and thereby to initiate a backwashing operation.

6. A device according to claim 5, wherein said displaceable member includes a plunger movable in a cylinder and including a diaphragm dividing the cylinder into said first-mentioned and second chambers.

7. A device according to claim 5, wherein said fluid passageway has a larger cross-sectional area than said vent so as to start the relative rotation between the filter body and the backwash nozzle from the home position when a backwash operation is initiated.

8. A device according to claim 5, wherein said fluid passageway comprises a one-way valve permitting the flow of fluid from the pressurized source in one direction into said first-mentioned chamber, but blocking the reverse flow of fluid therethrough from said first-mentioned chamber.

9. A device according to claim 8, wherein said one-way valve includes means for enabling the flow of the fluid in both directions through said passageway to permit the backwash operation to be terminated even when the position sensing means does not sense the home angular position of the filter body with respect to the backwash nozzle.

* * * * *